(12) United States Patent
Artmann et al.

(10) Patent No.: US 7,276,277 B2
(45) Date of Patent: Oct. 2, 2007

(54) MICROMECHANICAL COMPONENT, IN PARTICULAR A SENSOR ELEMENT, HAVING A STABILIZED MEMBRANE AND A METHOD OF PRODUCING SUCH A COMPONENT

(75) Inventors: Hans Artmann, Magstadt (DE); Robert Siegel, Reute (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 09/886,522

(22) Filed: Jun. 21, 2001

(65) Prior Publication Data

US 2002/0094435 A1 Jul. 18, 2002

(30) Foreign Application Priority Data

Jun. 21, 2000 (DE) ................ 100 30 352

(51) Int. Cl.
*H01L 21/36* (2006.01)
(52) U.S. Cl. .............. 428/156; 428/166; 428/172; 438/5; 438/54
(58) Field of Classification Search .......... 428/156, 428/166, 172; 337/298, 36; 257/414; 438/5, 438/54
See application file for complete search history.

(56) References Cited

U.S. PATENT DOCUMENTS

| | | | | |
|---|---|---|---|---|
| 4,897,360 A | * | 1/1990 | Guckel et al. ............ | 216/2 |
| 4,975,390 A | * | 12/1990 | Fujii et al. ............... | 438/53 |
| 5,259,247 A | * | 11/1993 | Bantien .................... | 73/718 |
| 5,712,609 A | * | 1/1998 | Mehregany et al. ...... | 337/70 |
| 5,834,334 A | * | 11/1998 | Leedy ...................... | 438/107 |
| 5,985,328 A | | 11/1999 | Chu et al. ................. | 424/489 |

FOREIGN PATENT DOCUMENTS

DE 197 52 208 6/1999
WO WO 00/32512 6/2000

OTHER PUBLICATIONS

Andrew D. Oliver, et al., "A Bulk-Micromachined 1024-Element Uncooled Infrared Imager", Tranducers '95, Eurosensors IX, pp. 636-639, Jun. 1995.
Gregory T.A. Kovacs, et al., "Bulk Micromachining Of Silicon", Proceedings of the IEEE, vol. 86, No. 8, Aug. 1998, pp. 1536-1550.

* cited by examiner

Primary Examiner—Alicia Chevalier
(74) Attorney, Agent, or Firm—Kenyon & Kenyon LLP

(57) ABSTRACT

A micromechanical component and a method of producing same are described; the component has a supporting body, in particular a silicon body, and a membrane which is connected to the supporting body and is unsupported at least in some areas. The membrane is also provided with at least one stabilizing element in an unsupported area in some areas of the surface. The method described here includes the following process steps: a) forming a first area within the supporting body including at least a first surface area of the supporting body; b) forming a second surface area of the supporting body which is in the first surface area in at least some areas; c) selective etching of the first area down to an adjustable depth, forming porous silicon, the second surface area being at least almost not etched; d) depositing a membrane layer on the surface of the supporting body, with the membrane layer covering the first area that has been rendered porous in at least some areas and covering the second surface area in at least some areas, and e) selectively removing the first area which has been rendered porous.

14 Claims, 3 Drawing Sheets

MICROMECHANICAL COMPONENT, IN PARTICULAR A SENSOR ELEMENT, HAVING A STABILIZED MEMBRANE AND A METHOD OF PRODUCING SUCH A COMPONENT

FIELD OF THE INVENTION

The present invention relates to a micromechanical component, particular a sensor element, having a stabilized membrane that is unsupported in at least some areas and a method of producing such a component.

BACKGROUND INFORMATION

Commercially available micromechanical membrane sensors based on silicon technology are usually implemented in the form of thin-film membranes, produced by first depositing layer systems in thicknesses between a few tens of nanometers and a few micrometers as the membrane layer and then removing the supporting substrate beneath it in the areas where the membrane is to be unsupported. Such membranes are often used for thermal separation of sensor elements arranged on the surface of the membrane from surrounding components arranged on the supporting substrate made of silicon.

Such a thermal membrane sensor and method of producing same is proposed in German Published Patent Application No. 197 52 208, for example, on which the present invention is based. In particular, it describes first depositing a thin layer of silicon carbide, silicon oxide or silicon nitride over an area of porous silicon formed in the surface of a silicon substrate. Then by a dry etching method, openings which extend down to the porous silicon layer are formed in this silicon carbide or silicon nitride layer. After arranging printed conductor structures, semiconductor components or thermocouples on the surface of the unsupported membrane to be formed, finally the sacrificial layer of porous silicon beneath the unsupported membrane to be produced is removed with a suitable solvent such as ammonia, KOH or TMAH. This forms a hollow space beneath the membrane layer, thermally isolating the sensor membrane from the surrounding substrate.

In addition to the method according to German Published Patent Application No. 197 52 208 for exposing the membrane, i.e., using a sacrificial layer which is produced before depositing the membrane on the front side of the substrate and then is removed later from the front side of the substrate through producing openings in the membrane by dissolution, it is also known that the membrane to be exposed can be exposed from the backside of the substrate by etching the entire substrate from the backside until forming the desired unsupported membrane on the front side. Both known methods, which differ fundamentally, are assigned to the categories of surface micromechanics (SMM) and bulk micromechanics, respectively.

Porous silicon is a possible sacrificial layer for a surface micromechanical etching process to produce a largely unsupported membrane such as that known from German Published Patent Application No. 197 52 208. Production of porous silicon is based on an electrochemical reaction between hydrofluoric acid and silicon in which the silicon is connected as the anode with respect to the hydrofluoric acid electrolyte, producing a spongy structure in the silicon. Due to this porous structure, the silicon then has a large internal surface area and thus has different chemical properties from the surrounding silicon. For example, the reactivity of porous silicon is greatly increased in comparison with that of bulk silicon, thus permitting a selective dissolution process.

It is known that doped silicon substrates are suitable for the production of porous silicon, generally using p-doped silicon substrates with different degrees of doping for this purpose. The structure size inside the resulting porous silicon can be defined by the degree of doping, i.e., it is possible to form both nanoporous silicon having a pore size between 1 nm and 5 nm and mesoporous silicon having a pore size is between 5 nm and 50 nm due to a high p-doping.

SUMMARY OF THE INVENTION

The micromechanical component according to the present invention and the method according to the present invention for producing such a component have the advantage in comparison with the related art that the effect of stresses in the unsupported membrane can be reduced significantly due to the stabilizing element which is connected in some areas to the surface of the unsupported area of the membrane thus produced, so that the mechanical stability of this membrane is increased in particular without any other change in membrane design. In addition, the development and in particular the propagation of damage such as cracks, sometimes due to production techniques, which often begin at corners of the membrane or holes in the membrane, are also prevented by this stabilizing element. Furthermore, the resistance of the component thus produced to material fatigue and short-term overloading is also increased by the stabilizing element according to the present invention.

In addition, it is advantageous that through the method according to the present invention it is possible to stabilize membranes and micromechanical components which have been produced by either a surface micromechanical production process or a bulk micromechanical production process.

In addition, it is also advantageous that with the method according to the present invention the stabilizing element can be produced beneath the unsupported membrane in a surface micromechanical production process, in particular without requiring any additional process steps, so that integration into existing manufacturing installations is unproblematic. On the other hand, if the unsupported membrane to be produced must not have any openings or etching holes, it is also possible to easily remove the sacrificial layer of porous silicon beneath the unsupported membrane in a known manner by opening the substrate or the supporting body on the rear side, i.e., in a bulk micromechanical process.

It is thus advantageous if the stabilizing element(s) is/are designed in such a way as to counteract deformation of the unsupported membrane, in particular warping, and the development of stresses in the membrane which is often associated with such deformation.

Another advantageous embodiment of the stabilizing element provides for it to be arranged in the form of webs, in particular a plurality of parallel webs or in the form of a mesh-like or grid-like arrangement of webs on one side between the unsupported membrane and the supporting body beneath it, and for it to be bonded directly to the membrane. In addition, the stabilizing elements may also be in the form of ring-shaped webs or skirts for holes, which surround etching holes produced in the membrane, for example. This suppresses propagation of cracks in the membrane which often begin at these etching holes.

Suitable materials for the unsupported membrane or membrane layer to be produced on the surface of the supporting body made of silicon include in a known way silicon nitride, silicon dioxide, silicon carbide or a combination thereof, formed as a layer with a preferred thickness of 10 nm to 10 µm, especially 10 nm to 1 µm. Then any desired variety of circuit structures, in particular thermocouples, sensitive components of a sensor element and printed conductors may be arranged in a known way to advantage on this membrane which is largely unsupported or unsupported at least in some areas.

It is also advantageous that the membrane layer deposited first on the surface of the supporting body may be deposited either over the whole area or in a structured form, so that largely any desired forms of the membranes which are subsequently structured out of the layer and are largely unsupported can be produced.

It is also not obligatory for the membranes that are produced to completely cover the stabilizing elements which are preferably located beneath them, i.e., it is quite feasible and in certain applications it may even be advantageous for the stabilizing elements that are produced to be directly accessible from the top of the supporting body in some areas, i.e., not completely covered by the membrane layer. In this way it is possible, for example, to produce a plurality of membranes that are isolated from one another on the surface of the supporting body but are interconnected by stabilizing elements and at the same time are mechanically stabilized by these stabilizing elements. For this purpose, the stabilizing elements are then preferably beneath the unsupported membrane in some areas while being freely accessible at the surface in other areas, i.e., not covered by a membrane layer. Thus, it is now possible to produce membrane layers of silicon dioxide or silicon nitride that are isolated from one another and are interconnected and/or connected to the supporting body, preferably only by stabilizing elements made of silicon.

To produce the stabilizing elements used according to the present invention, n-doped silicon is suitable in an especially advantageous manner because in this case the difference in the etching behavior of p-doped silicon and n-doped silicon can be utilized. For example, under the conditions under which porous silicon can be produced in p-doped silicon, this porous silicon cannot be produced in n-doped silicon or it can only be produced to a negligible extent. Thus, a thin layer of n-doped silicon at the surface of an otherwise p-doped region in the supporting body, which is then subsequently rendered porous by a selective etching process, forming a recess or cavern, is especially suitable for producing the stabilizing elements beneath the membrane which is to be exposed. In this removal of the p-doped region, the n-doped regions in the supporting body are not attacked, so these regions remain in the form of the stabilizing elements to be produced. It is also advantageous in this method that the thickness of the stabilizing elements to be produced can be adjusted easily through the process parameters, i.e., the dopant dose, the implantation energy or a subsequent injection of dopants. Furthermore, the development of porous silicon is a more or less isotropic process, so there is always complete underetching of the stabilizing elements, i.e., the n-doped regions.

Due to the possibility of adjusting the thickness of the stabilizing elements to be produced via the thickness of the n-doped regions, the degree of stabilization and the mechanical stability of the stabilizing elements can be adjusted easily to the given requirements for the respective micromechanical component.

DETAILED DESCRIPTION

The present invention is based on the production of a thermal membrane sensor according to German Published Patent Application No. 197 52 208 as well as the production method described therein. This known membrane sensor is provided according to the present invention with a stabilizing element for mechanical stabilization of the largely unsupported membrane thus produced. To do so, the production method known from German Published Patent Application No. 197 52 208 is also modified at the same time. With regard to known details of the following embodiments and in particular with regard to details of individual process steps that are already known, reference is thus made first to German Published Patent Application No. 197 52 208.

Figure 1A:
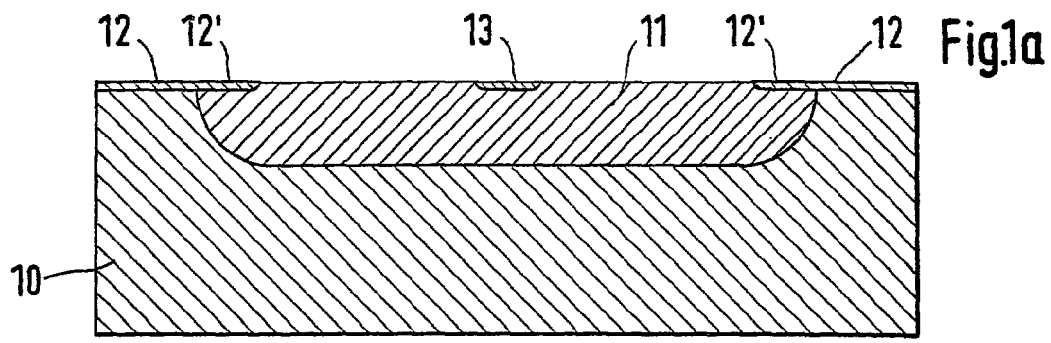
FIG. 1a is a first illustration of a first embodiment for production of a micromechanical component in a sectional view in various process steps.
Figure 1B:
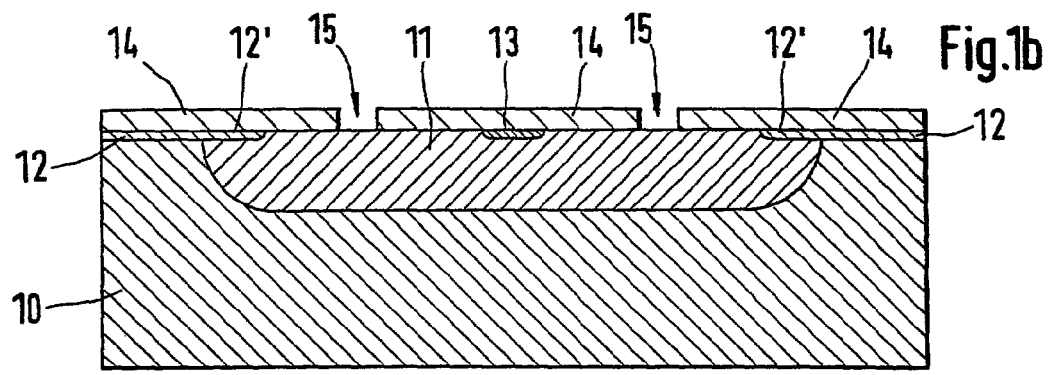
FIG. 1b is a second illustration of the first embodiment for production of a micromechanical component in the sectional view in various process steps.
Figure 1C:
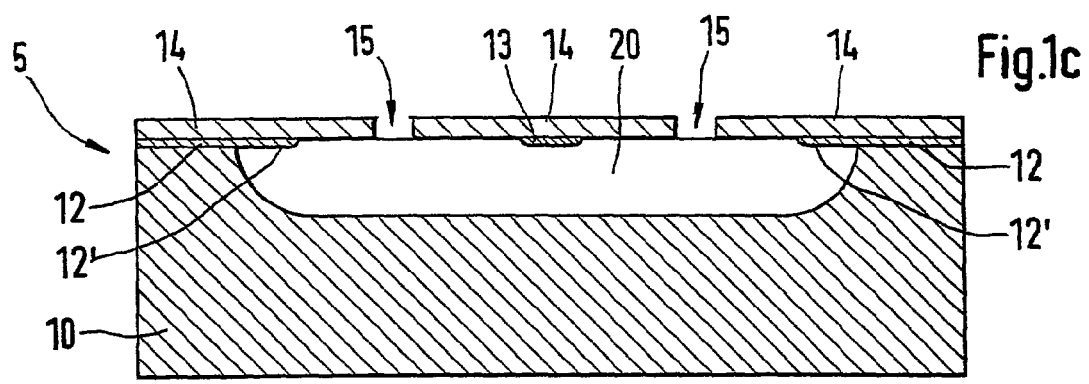
FIG. 1c is a third illustration of the first embodiment for production of a micromechanical component in the sectional view in various process steps.

The first embodiment is illustrated with the help of FIGS. 1a through 1c. FIG. 1a shows first a supporting body 10 in the form of a silicon body of a silicon wafer which is provided with p-doping on the surface within a first area 11. First area 11 is in the form of a trough and includes in particular a first surface area of supporting body 10 which assumes an at least approximately rectangular or circular shape as seen from above. The typical dimensions of first area 11 include a lateral extent of 1 mm×1 mm to 5 mm×5 mm and a typical depth of 1 µm to more than 100 µm.

It should be emphasized at this point that it is also possible for entire supporting body 10 or the entire surface of supporting body 10 to be made of p-doped silicon so that first area 11 does not differ at first from supporting body 10 beneath it with regard to its composition. In this case, the differentiation in first area 11 with regard to its structure from supporting body 10 does not come about until first area 11 has been rendered porous as described below, i.e., the p-doped silicon is converted to porous silicon.

FIG. 1a also shows how a second surface area 12, 12', 13 is formed on the surface of supporting body 10 and is within the first surface area in at least some areas. To do so, second surface area 12, 12', 13 is designed in the form of a masking layer on the surface of supporting body 10 by converting supporting body 10, i.e., first area 11 to n-doped silicon in the area of second surface area 12, 12', 13.

This conversion to n-doped silicon may take place by redoping the previous p-doped silicon of which supporting body 10 and/or first area 11 is made. For example, implanting phosphorus or arsenic and/or doping some areas of supporting body 10 or first area 11 with $POCl_3$ (called "phosphorus glass") in a known way is suitable for this redoping operation. The thickness of second surface area 12, 12', 13 may be adjusted in a defined manner through the process parameters in implantation or doping in a known way, i.e., through the dopant dose, the implantation power or by subsequent injection of dopants.

The thickness of second surface area 12, 12', 13 is typically between 10 nm and 3 μm, in particular between 50 nm and 1 μm.

In the embodiment illustrated here according to FIG. 1a, second surface area 12, 12', 13 is designed in the form of an intermediate layer 12 with edge webs 12' and webs 13 connected to it. Webs 13 here are inside the first surface area of supporting body 10 while edge webs 12' are located at the edge of the first surface area.

After second surface area 12, 12', 13 has been applied or produced in the manner described above in the form of an n-doped masking layer on the surface of the supporting body, i.e., first area 11, selective conversion of first area 11 of p-doped silicon into porous silicon takes place by electrochemical anodizing in a hydrofluoric acid electrolyte. The extent of first area 11 and in particular also the depth of first area 11 are adjusted in a known way through the etching parameters in electrochemical anodizing.

In this process of making first area 11 porous, the fact that second surface area 12, 12', 13 is at least almost not attacked at all in selective electrochemical etching due to the n-doping of the silicon there and thus remains unchanged is made use of. To this extent, porous silicon is formed only in first area 11 and not in second surface area 12, 12', 13. If necessary in an individual case, second surface area 12, 12', 13 can also be protected from etching attack, when second area 11 is made porous, by a suitable additional masking layer, e.g., made of $Si_3N_4$. In addition, in electrochemical etching, use is also made of the fact that the development of porous silicon is a mostly isotropic process, so that the masking layer in the form of second surface area 12, 12', 13 is completely undercut, especially in the area of web 13 and edge webs 12'.

FIG. 1b illustrates the next process step in which a membrane layer 14 is deposited on the surface of supporting body 10 and covers at least some areas of first area 11 which has already been rendered porous and at least some areas of second surface area 12, 12', 13. For example, this membrane layer 14 is a silicon carbide layer, a silicon dioxide layer, a silicon nitride layer or a combination of $SiO_2$, $Si_3N_4$ and SiC with a typical thickness of 10 nm to 10 μm, in particular 50 nm to 500 nm. Membrane layer 14 here is preferably deposited by a known CVD process or a known reactive sputtering process. In addition, it is readily possible according to FIG. 1b for membrane layer 14 not to be deposited on the entire surface of supporting body 10 but instead to be deposited only in some areas with the help of a suitable mask.

Furthermore, according to FIG. 1b, membrane layer 14 may be structured lithographically and opened up in some areas by a dry plasma etching method, for example, in which case etching holes 15 are formed in membrane layer 14, extending through membrane layer 14 into first area 11 of porous silicon.

FIG. 1c illustrates the next process step for producing a micromechanical component 5 by dissolving first area 11 of porous silicon away, starting from etching holes 15, with the help of a suitable solvent such as ammonia or a dilute potassium hydroxide solution. In the process, the porous silicon is dissolved almost completely in first area 11, forming a recess 20 in the form of a cavern.

As an alternative to dissolving out the porous silicon with a solvent, selective removal by oxidation of the porous silicon in first area 11, which has been rendered porous, and subsequent dissolution of the oxidized porous silicon with the help of hydrofluoric acid may also be used. This procedure has the advantage that it prevents unwanted development of bubbles in dissolving out the porous silicon. On the other hand, however, it may result in stresses in the porous silicon which can result in unwanted deformation.

On the whole, in the process step according to FIG. 1c, a membrane 14 formed on the surface of supporting body 10 is unsupported in at least some areas over recess 20 and is mechanically stabilized on its lower side by web 13 and edge webs 12', in particular in the unsupported area. In a top view, membrane 14 also has etching holes 15. In addition, an intermediate layer 12 is provided at the surface between supporting body 10 and membrane 14 in the areas of supporting body 10 not encompassed by recess 20.

It is clear that the embodiment described here is not subject to any restrictions with regard to the structuring of second surface 12, 12', 13. Web 13 in particular is important for effective mechanical stabilization of membrane 14. To this extent, edge webs 12' and intermediate layer 12 may also be omitted by performing a corresponding structuring of the second surface area.

Figure 2:
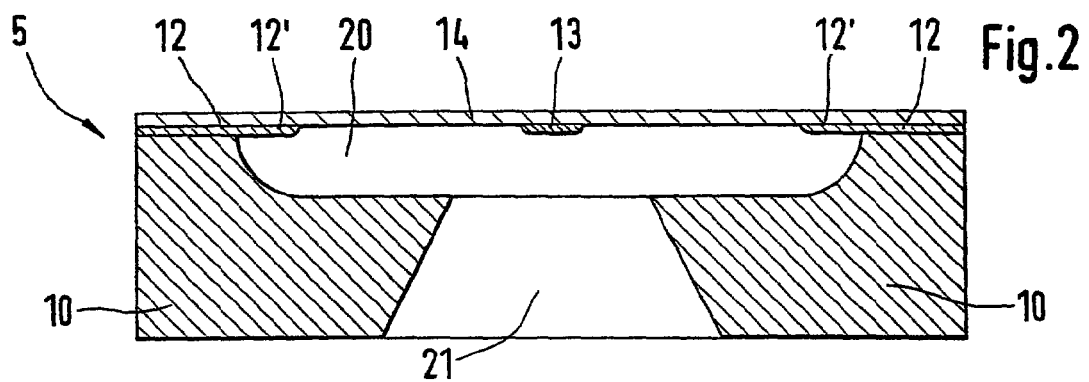
FIG. 2 illustrates a second embodiment of a micromechanical component in a sectional view, where the supporting body has been opened from its rear side.

FIG. 2 illustrates a second embodiment for production of a micromechanical component 5 which differs from the first embodiment according to FIGS. 1a through 1c only in that no etching holes 15 have been produced in the membrane layer or in membrane 14, which is largely unsupported, and instead, an opening 21 has been produced in supporting body 10, allowing access to recess 20 from the rear.

In particular, opening 21 which extends into first area 11 of porous silicon was produced first in a known way on the side of the surface of supporting body 10 facing away from membrane layer 14. Then the porous silicon was dissolved out of first area 11 from the rear side of supporting body 10 through opening 21, thus forming recess 20. In this way, membrane or membrane layer 14 remains undamaged because no openings or etching holes 15 are necessary to gain access to first area 11.

Moreover, it should be emphasized that additional circuit structures, in particular thermocouples, printed conductors or other sensitive components in general may also be arranged in a known way on the surface of membrane 14 for use of micromechanical component 5 according to the two embodiments described above, e.g., as a sensor element.

Figure 3A:
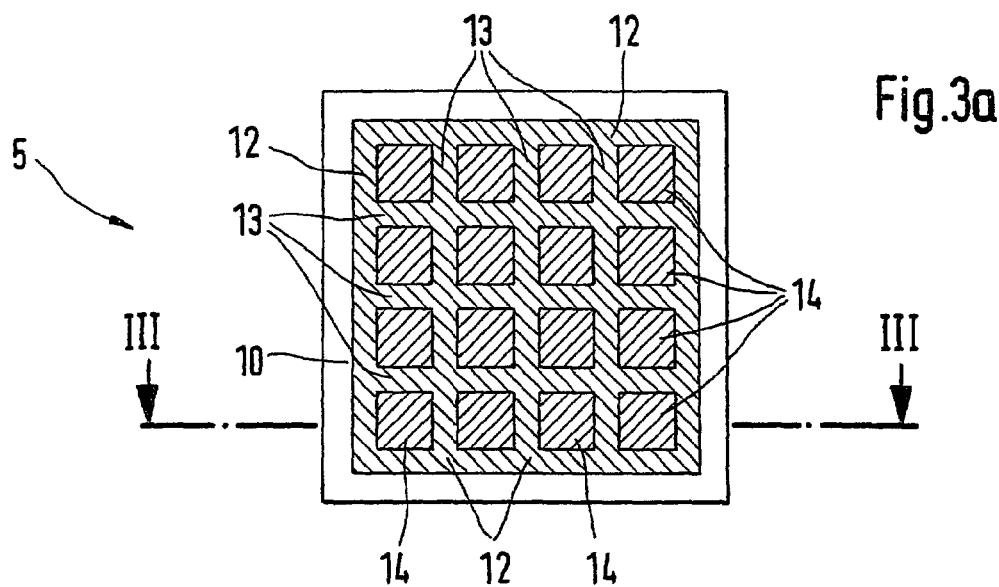
FIG. 3a illustrates a third embodiment of a micromechanical component in a top view.
Figure 3B:
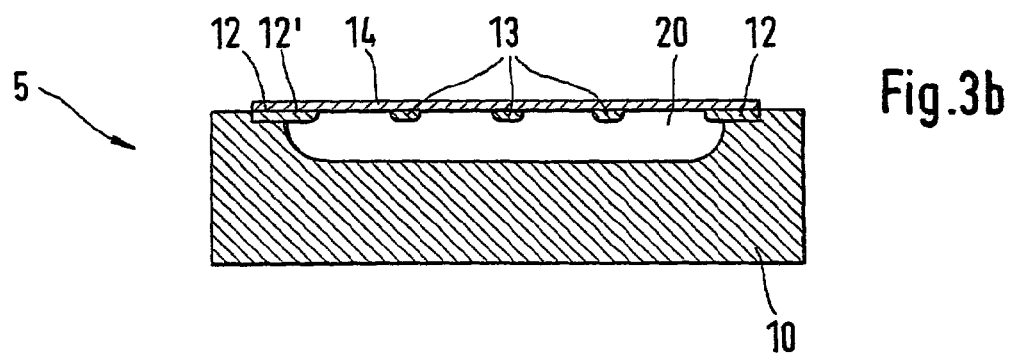
FIG. 3b illustrates the third embodiment of a micromechanical component in a sectional view along lines III-III.

FIGS. 3a and 3b illustrate a third embodiment of a micromechanical component 5, starting first with a rectangular supporting body 10 made of p-doped silicon according to FIG. 3a at the surface. In addition, a second surface area 12, 12', 13 in the form of n-doped silicon is produced on the surface of supporting body 10, as explained above. To do so, the p-doped silicon in this second surface area 12, 12', 13 is redoped to form n-doped silicon. Thus on the whole, a masking layer in the form of second surface area 12, 12', 13, which has a checkerboard structure in the example according to FIG. 3a illustrated here, is formed on the surface of supporting body 10, with intermediate layer 12 and edge webs 12' running around the periphery in the form of a frame and webs 13 running inside the second surface area.

Then membrane layer 14 is deposited in a known way in the form of a silicon carbide layer or a silicon nitride layer on the surface of supporting body 10, and finally first area 11, as already known from FIG. 1b, is converted to porous silicon by electrochemical anodizing in a hydrofluoric acid electrolyte.

Then, as already explained with the help of FIG. 1c, first area 11 of porous silicon is removed selectively through etching holes 15 produced in membrane layer 14, while second surface area 12, 12', 13 remains. In doing so, second surface area 12, 12', 13, which now functions as a masking layer, is completely underetched in the area of first area 11.

As an alternative, however, first area 11 may also be made of porous silicon, then optionally oxidized at least in part and membrane layer 14 deposited over the entire area thereof. Next, suitable sensor structures or circuit structures may be applied to membrane layer 14 before membrane layer 14 is opened through etching holes 15 in the following process steps and the porous silicon or oxidized porous silicon is removed.

Thus, on the whole according to FIG. 3b, which does not show etching holes 15 and possible circuit structures or other components already produced or to be produced later on the surface of membrane layer 14, an at least largely unsupported membrane 14 is formed, resting on supporting body 10 which functions as a frame in the area of intermediate layer 12 and being stabilized by it mechanically in the area of edge webs 12' running around the periphery. In addition, webs 13 arranged in a grid pattern or a checkerboard pattern are also formed in the unsupported area of membrane 14 and uniformly stabilize membrane 14 mechanically.

In particular, it should be emphasized here that membrane layer 14 completely covers webs 13 and edge webs 12', apart from openings produced by dissolution or etching 15 (not shown) for removing porous silicon (see FIG. 1c or FIG. 6b), i.e., they are not actually visible in a top view in FIG. 3a. Nevertheless, they are shown in FIG. 3a for the purpose of better illustration, although they are actually located beneath smooth sheet-like membrane 14.

Figure 4:
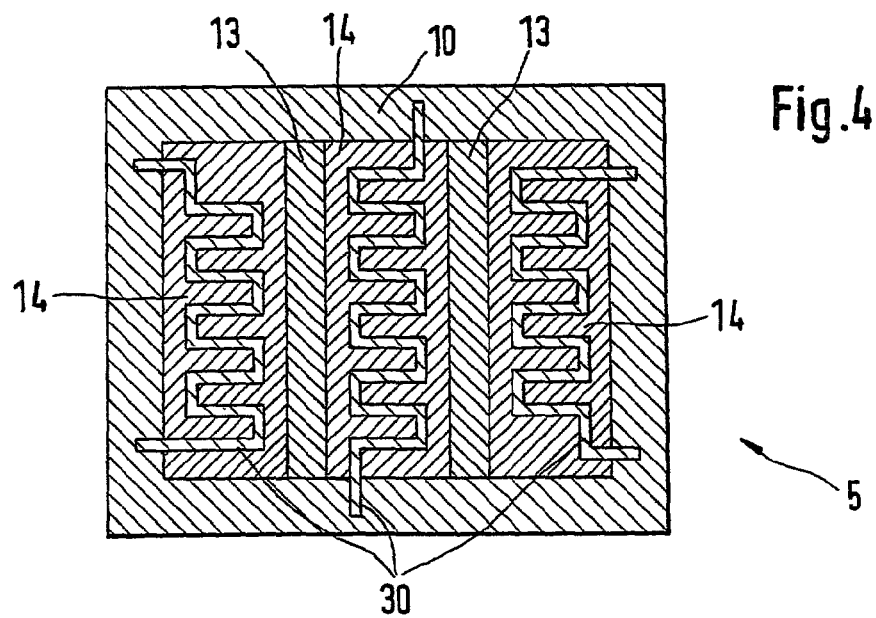
FIG. 4 shows in a top view another embodiment of a micromechanical component, with additional circuit structures arranged on the surface of the stabilized, largely unsupported membrane thus produced.

FIG. 4 illustrates a fourth embodiment which differs from the embodiment according to FIG. 3a only in that webs 13 are arranged in the form of two webs arranged parallel to one another as a stabilizing element beneath membrane 14. In addition, edge webs 12' and intermediate layer 12 have been omitted in FIG. 4 in that the second surface area has been provided only in the area of webs 13 which are to be formed later within first area 11. However, this omission of edge webs 12' and intermediate layer 12 is not obligatory. FIG. 4 also shows webs 13 again in a top view, although they are actually located beneath one-piece closed membrane 14. Webs 13 in FIG. 4 also function in particular to suppress warping of membrane 14. FIG. 4 also shows how a total of three circuit structures in the form of meandering printed resistors are arranged on the surface of membrane 14. Such a design is suitable in particular for a flow sensor.

Figure 5:
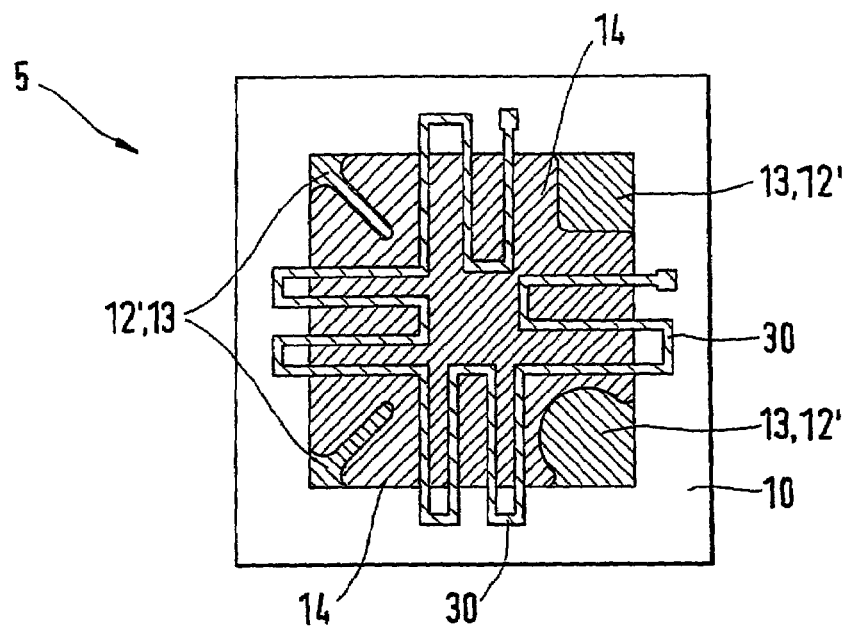
FIG. 5 shows in a top view another embodiment of a micromechanical component, with additional circuit structures arranged on the surface of the stabilized, largely unsupported membrane thus produced.

FIG. 5 illustrates a fifth embodiment of a micromechanical component 5, shown in a top view which differs from FIGS. 3a and 4 only in the shape of the applied circuit structure and the shape of second surface area 12, 12', 13 on the surface of supporting body 10.

Specifically, FIG. 5 shows that second surface area 12, 12', 13 in the form of stabilizing areas 13 is provided in the corner areas of membrane 14, these stabilizing areas 13 extending beneath membrane 14 in the unsupported area. To this extent, stabilizing areas 13 provide stabilization of membrane 14 mainly in its corner areas, preventing the propagation of cracks and stresses there. In FIG. 5, the second surface area or webs 13 and edge webs 12' formed from it after the development of recess 20 are located beneath membrane 14.

FIG. 5 also illustrates that stabilizing areas 13 may be designed in almost any shapes, but preferably with rounded edges. In particular, web-shaped, ring-shaped, semicircular, rectangular, mesh-like, grid-like, rod-like or tongue-like stabilizing areas 13 are suitable. Moreover, it should be emphasized that stabilizing areas 13 and edge webs 12' may also be provided beneath membrane 14 in FIG. 5, i.e., membrane 14 covers them completely. In addition, as already known from FIG. 1c or 3b, recess 20 is also located beneath membrane 14.

Moreover, it is possible to easily structure membrane layer 14 in such a way that stabilizing areas 13 are directly visible in areas in the top view in FIG. 5 due to the fact that suitable structuring of membrane layer 14 has already been performed in deposition of membrane layer 14. In this case, membrane layer 14 does not cover all the n-doped areas of the first surface area. As a rule, however, membrane layer 14 is at first deposited over the whole area and is then structured by lithography steps.

Figure 6A:
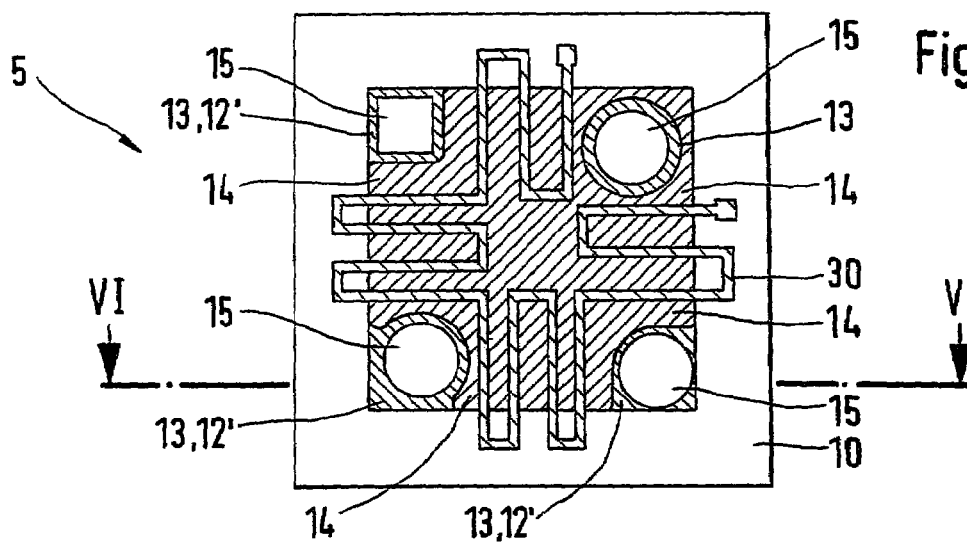
FIG. 6a illustrates a sixth embodiment of a micromechanical component as shown in a top view.
Figure 6B:
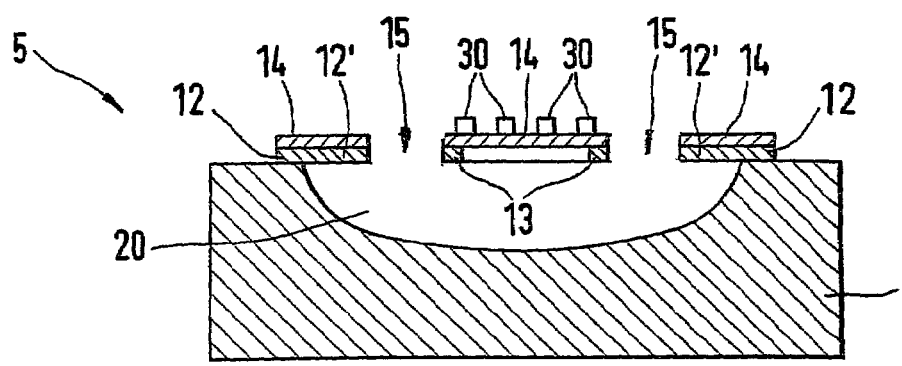
FIG. 6b shows a sectional view along line VI-VI of the sixth embodiment.

Finally, FIGS. 6a and 6b illustrate a sixth embodiment of a micromechanical component 5 with circuit structures 30 applied to it, with the borders for dissolving openings or etching holes 15 with webs 13 and edge webs 12' illustrated as stabilizing elements in this embodiment in particular. Providing a border for etching holes 15 with such stabilizing elements has the advantage that tiny faults or defects in etching holes 15 cannot propagate due to stresses present in membrane 14.

Thus, rectangular etching holes 15 are now also possible because the notch effect which is otherwise caused by corners is compensated here by the stabilizing elements surrounding etching holes 15. Such rectangular etching holes 15 have the advantage that they can also be designed to be larger, depending on the arrangement of circuit structures or sensitive components on the surface of membrane 14.

FIG. 6a shows a top view of a micromechanical component 5, while FIG. 6b shows a section through FIG. 6a along the sectional line shown there. In particular, it should be emphasized here that membrane 14 in FIG. 6a also always covers webs 13 and edge webs 12' viewed from above. To this extent, webs 13 and edge webs 12' in FIG. 6a are shown as visible only for the sake of illustration.

Furthermore, FIG. 6a shows how different positions and geometries of etching holes 15 can be stabilized by webs 13 or edge webs 12' surrounding them by means of a suitable structuring of the second surface area. Otherwise, the embodiment according to FIGS. 6a and 6b does not differ from the embodiment already explained with reference to FIGS. 1a through 1c.

What is claimed is:
1. A micromechanical component, comprising:
    a supporting body;
    at least one at least partially unsupported membrane connected to the supporting body;

at least one stabilizing element provided in an unsupported area on some areas of a surface of the at least one membrane, wherein the at least one membrane extends continuous over an entire recess etched in the supporting body, and a portion of the at least one stabilizing element contacts only the membrane for a part less than a whole depth of the recess of the membrane and a portion of the at least one stabilizing element is positioned between the supporting body and the at least one membrane, wherein at least a part of the stabilizing element is exposed to the recess etched in the supporting body wherein the at least one stabilizing element includes at least a ring-shaped skirt arranged around one of recesses and etching holes in the at least one membrane, and wherein the micromechanical component is configured as a thermal membrane sensor and the at least one stabilizing element is configured to counteract a deformation of the at least one membrane; and wherein a circuit structure is positioned on the at least one membrane and the circuit structure includes at least a sensitive component of the sensor element.

2. The micromechanical component according to claim 1, wherein:
the deformation includes one of a warping, a propagation of cracks, and a propagation of stresses in the at least one membrane.

3. The micromechanical component according to claim 1, wherein:
the at least one stabilizing element includes one of:
a web,
a plurality of webs,
parallel webs,
an arrangement of webs configured in a mesh,
an arrangement of webs configured in a grid,
a web designed as a ring,
a plurality of webs designed in concentric rings, and
a stabilizing area designed in the shape of one of a tongue and a rod.

4. The micromechanical component according to claim 1, wherein:
the at least one stabilizing element includes at least one of:
a ring-shaped skirt arranged around one of recesses and etching holes in the at least one membrane, and
a stabilizing surface in corner areas of the at least one membrane.

5. The micromechanical component according to claim 1, wherein:
the at least one stabilizing element is arranged on one side of the at least one membrane facing the supporting body.

6. The micromechanical component according to claim 1, wherein:
the at least one stabilizing element is in direct contact with the at least one membrane and is bonded thereto in at least some areas in the unsupported area.

7. The micromechanical component according to claim 1, wherein:
the supporting body includes a silicon body.

8. The micromechanical component according to claim 1, wherein:
the at least one membrane includes a silicon compound and has a thickness of 10 nm to 10 μm.

9. The micromechanical component according to claim 8, wherein:
the silicon compound includes one of a silicon nitride layer, a silicon carbide layer, and a silicon dioxide layer.

10. The micromechanical component according to claim 1, wherein:
the circuit structure further includes at least one thermocouple.

11. The micromechanical component according to claim 1, wherein:
a thickness of the at least one stabilizing element is between 10 nm and 5 μm.

12. The micromechanical component according to claim 1, wherein the at least one stabilizing element is not covered by at least one membrane in at least one area.

13. The micromechanical component according to claim 1, wherein the at least one stabilizing element directly contacts the supporting body.

14. The micromechanical component according to claim 1, wherein the at least one stabilizing element is freely accessible in at least one area.

* * * * *